United States Patent
Hara et al.

(10) Patent No.: US 7,532,107 B2
(45) Date of Patent: May 12, 2009

(54) ANTI-THEFT SYSTEM FOR VEHICLE

(75) Inventors: Tetsuya Hara, Okazaki (JP); Shogo Kameyama, Chiryu (JP); Masaaki Ozaki, Kariya (JP)

(73) Assignee: Denso Corporation, Kariya (JP)

( * ) Notice: Subject to any disclaimer, the term of this patent is extended or adjusted under 35 U.S.C. 154(b) by 188 days.

(21) Appl. No.: 11/218,516

(22) Filed: Sep. 6, 2005

(65) Prior Publication Data

US 2006/0049921 A1   Mar. 9, 2006

(30) Foreign Application Priority Data

Sep. 6, 2004   (JP)   ............................. 2004-258727
Sep. 6, 2004   (JP)   ............................. 2004-258986

(51) Int. Cl.
    *B60R 25/10* (2006.01)
(52) U.S. Cl. ................. 340/426.1; 340/435; 340/426.5; 340/572.1; 701/45; 307/10.2; 307/10.3; 307/10.4; 307/10.6
(58) Field of Classification Search ................. 340/435, 340/426.1, 425.5, 572.1; 701/45; 307/10.2–10.5
    See application file for complete search history.

(56) References Cited

U.S. PATENT DOCUMENTS

| | | | |
|---|---|---|---|
| 5,519,260 A * | 5/1996 | Washington | 307/10.5 |
| 6,611,742 B1 | 8/2003 | Sand et al. | 701/36 |
| 6,647,270 B1 * | 11/2003 | Himmelstein | 455/456.1 |
| 6,946,959 B2 * | 9/2005 | Wang | 340/539.22 |
| 2003/0102958 A1 * | 6/2003 | Gudmundsson | 340/5.7 |
| 2004/0188164 A1 | 9/2004 | Maeno et al. | 180/287 |
| 2006/0049925 A1 | 3/2006 | Hara et al. | 340/435 |

FOREIGN PATENT DOCUMENTS

| | | |
|---|---|---|
| JP | A-2003-044961 | 2/2003 |
| JP | A-2003-81061 | 3/2003 |
| JP | A-2003-85676 | 3/2003 |
| JP | A-2003-252176 | 9/2003 |
| JP | A-2004-030480 | 1/2004 |

OTHER PUBLICATIONS

Office Action dated Jul. 7, 2008 in corresponding Japanese patent application No. 2004-258920 (and English translation).
Office Action dated Feb. 21, 2008 in the related U.S. Appl. No. 11/218,525.
First Office Action issued from the U.S. Patent Office on Jun. 28, 2007 for the related U.S. Appl. No. 11/218,525.

* cited by examiner

*Primary Examiner*—Benjamin C. Lee
*Assistant Examiner*—Ojiako Nwugo
(74) *Attorney, Agent, or Firm*—Posz Law Group, PLC

(57) ABSTRACT

An anti-theft system for a vehicle includes schedule taking means for taking a usage schedule of the vehicle, wherein the usage schedule of the vehicle includes a future time for the vehicle to be used next, interval calculating means for calculating an interval between a present time and the future time, and security level setting means for setting a security level of the anti-theft system based on the interval between the present time and the future time.

13 Claims, 10 Drawing Sheets

| LEVEL | 0 | 1 | 2 | 3 | 4 |
|---|---|---|---|---|---|
| SECURITY OF LOCK | N/A | DOOR LOCK | ELECTRIC LATCH LOCK | ELECTRIC LATCH LOCK DISABLED | ELECTRONIC CHECK PROHIBITED |
| CANCELLATION METHOD | N/A | MECHANICAL KEY OR ELECTRONIC KEY | ELECTRONIC KEY | SPECIAL OPERATION | BIOMETRICS IDENTIFICATION |
| WARNING SIGNAL | N/A | HAZARD LAMP FLASHED | BUZZER SOUNDS | WARNING SIREN | REPORTING TO CENTER |
| ANOMALY SENSING METHOD | N/A | SENSING VIBRATION | SENSING UNUSUAL UNLOCK ACTION | SENSING CURRENT | MONITORING VEHICLE SURROUNDINGS |
| THRESHOLD VALUE FOR SENSING ANOMALY | N/A | MAXIMUM | LARGE | MIDDLE | MINIMUM |
| INTERVAL FOR RENEWING SECURITY LEVEL | 30 SECONDS | 5 MINUTES | 1 HOUR | 3 HOURS | 12 HOURS |

| LEVEL | 0 | 1 | 2 | 3 | 4 |
|---|---|---|---|---|---|
| SECURITY OF LOCK | N/A | DOOR LOCK | ELECTRIC LATCH LOCK | ELECTRIC LATCH LOCK DISABLED | ELECTRONIC CHECK PROHIBITED |
| CANCELLATION METHOD | N/A | MECHANICAL KEY OR ELECTRONIC KEY | ELECTRONIC KEY | SPECIAL OPERATION | BIOMETRICS IDENTIFICATION |
| WARNING SIGNAL | N/A | HAZARD LAMP FLASHED | BUZZER SOUNDS | WARNING SIREN | REPORTING TO CENTER |
| ANOMALY SENSING METHOD | N/A | SENSING VIBRATION | SENSING UNUSUAL UNLOCK ACTION | SENSING CURRENT | MONITORING VEHICLE SURROUNDINGS |
| THRESHOLD VALUE FOR SENSING ANOMALY | N/A | MAXIMUM | LARGE | MIDDLE | MINIMUM |
| INTERVAL FOR RENEWING SECURITY LEVEL | 30 SECONDS | 5 MINUTES | 1 HOUR | 3 HOURS | 12 HOURS |

ANTI-THEFT SYSTEM FOR VEHICLE

CROSS REFERENCE TO RELATED APPLICATION

This application is based on and incorporates herein by reference Japanese Patent Applications No. 2004-258986 filed on Sep. 6, 2004 and No. 2004-258727 filed on Sep. 6, 2004.

BACKGROUND OF THE INVENTION

1. Field of the Invention

The present invention relates to an anti-theft system for a vehicle. This system has a plurality of security levels.

2. Description of Related Art

In order to protect vehicles from thefts, vehicle users have applied protective methods, such as installing vehicle anti-theft devices, and the users have reduced damages. Also, the vehicle users purchase burglary and theft insurances in order to reduce the damage in case of the theft. However, because criminal techniques for the vehicle theft have been improved in recent years, it is not possible to effectively prevent the theft only by installing the anti-theft devices on the vehicles.

Also, the vehicle user does not know historical data of the theft occurrences of a parking location, where the vehicle user chooses to park the vehicle. Thus, even when the vehicle user sets a security level of the anti-theft device, the set security level may be much lower than a security level, which corresponds to a risk level of a theft of the parking location. Furthermore, the vehicle user may not activate the anti-theft device when the user expects to park the vehicle only for a short time.

Therefore, an anti-theft system, which sets the security levels based on theft information of parking spaces, is proposed. Specifically, a control center provides a plurality of the security levels as vehicle anti-theft information services. In a place where the risk level of the theft is high, the security level is increased so that an anomaly sensing level is increased in order to sensitively sense the anomaly. Also, in a place where the risk level of the theft is low, the anomaly sensing level is decreased in order to insensitively sense the anomaly. Thus, optimum security levels are set according to conditions (see Unexamined Japanese Patent Publication No. 2003-085676).

In an invention according to the Unexamined Japanese Patent Publication No. 2003-085676, the sensing level is mainly changed and a difficulty of unlocking the vehicle is not changed. In other words, only the sensing level for a theft action is changed, but a difficulty for unlocking a security for the vehicle is not changed. Therefore, if the theft action is conducted effectively, the vehicle may be stolen before a guard or a policeman arrives. As the security levels are increased to make it difficult to unlock the security, the vehicle is more limited from being stolen. However, the blindly increased security levels may make the vehicle more inconvenient for the vehicle users to use.

SUMMARY OF THE INVENTION

The present invention addresses the above disadvantages. Thus, it is an objective of the present invention to provide a vehicle anti-theft system, which achieves both security and conveniences for vehicle users.

To achieve the objective of the present invention, there is provided an anti-theft system for a vehicle. The anti-theft system takes a usage schedule of the vehicle, which includes a future time for the vehicle to be used next. Then, the anti-theft system calculates an interval between a present time and the future time. Then, the anti-theft system sets a security level of the anti-theft system based on the interval between the present time and the future time.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
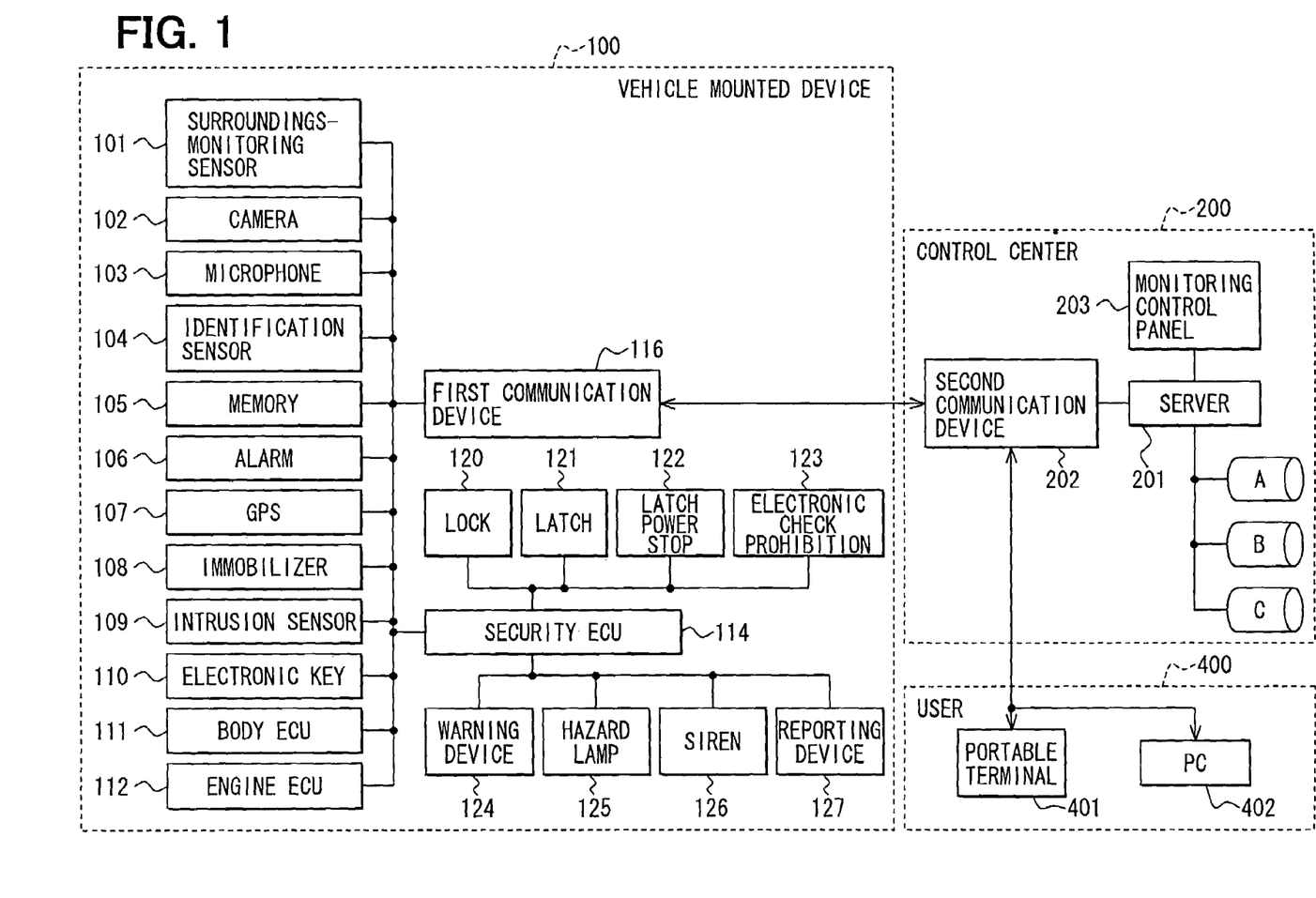
FIG. 1 is a block diagram showing a vehicle anti-theft system.

The vehicle anti-theft system according to the present embodiment will be described with reference to the accompanying drawings. FIG. 1 is a block diagram showing the vehicle anti-theft system. The vehicle anti-theft system includes a vehicle-mounted device 100, a vehicle anti-theft control center (a control center) 200, a portable terminal 401 and a personal computer (PC) 402. The vehicle-mounted device 100 is installed on a vehicle. The control center 200 controls the anti-theft for the vehicle, on which the vehicle-mounted device 100 is installed. The portable terminal 401, such as a cellular phone, is carried by a vehicle user (user) 400, and serves as security level changing means, user location sensing means and schedule taking means of the present invention. The PC 402 serves as security level changing means, the user location sensing means and the schedule taking means for the present invention.

The vehicle-mounted device 100 is connected and communicated with the control center 200 through a communication network between a first communication device 116 of the vehicle-mounted device 100 and a second communication device 202 of the control center 200. The vehicle-mounted device 100 transmits data, such as various sensor signals and image data, to the control center 200. Also, the control center 200 is networked to communicate with the portable terminal 401 or the PC 402 through the second communication device 202. The portable terminal 401 or the PC 402 remotely controls the vehicle-mounted device 100 through the control center 200. However, the connectable communication network is not limited to a public network or the Internet.

As shown in FIG. 1, for a monitoring function of the anti-theft system, the vehicle-mounted device 100 includes a surroundings-monitoring sensor 101, a camera 102, a microphone 103 and an identification sensor 104. The surroundings-monitoring sensor 101 senses an object, which approaches around the vehicle, by use of a supersonic wave and a radio wave, and serves as status sensing means of the present invention. The camera 102 takes pictures inside and around the vehicle, and serves as the status sensing means of the present invention. The microphone 103 senses sounds inside and around the vehicle, and serves as the status sensing means of the present invention. The identification sensor 104 identifies the vehicle user. The vehicle-mounted device 100 includes a memory 105 and an alarm 106. The memory 105 stores various data. The alarm 106 generates warning signals when the theft is highly likely to occur, and serves as alarming means of the present invention. The warning signals of the alarm 106 may include a buzzer sound by a warning device 124, flashing of a hazard lamp 125, flashing of an interior lamp and howler of a horn.

The identification sensor 104, which is user identifying means, identifies the user by use of a fingerprint, a voiceprint, a retina or iris image, a face shape and vein pattern of a palm. The fingerprint is sensed by a fingerprint verification device (not shown) mounted on a door knob. The voiceprint is inputted by the microphone 103. The retina or iris image is captured by the camera 102. Body fat, which is monitored by a body fat monitor (not shown) mounted on the door knob, may be used to identify the user. Identification criteria data is prestored in the memory 105.

Also, a sheet pressure-sensitive plane contact sensor and the fingerprint verification device may be mounted on the vehicle. The sheet pressure-sensitive plane contact sensor includes a plurality of dispersed pressure-sensitive contacts. Contact resistance (or contact capacity) of the pressure-sensitive contacts is changed with pressing force. Therefore, the user may be identified by use of a pressing force condition, the fingerprint and a palmar pattern when a hand of the user is pressed to the plane contact sensor. A bone conduction microphone may be mounted on the vehicle in addition to the normal microphone 103. Then, the user may be identified by use of air conduction sound, which is general sound, and bone conduction sound. The bone conduction microphone is pressed toward an ear or a jaw below the ear when in use. The basic structure of the bone conduction microphone is known, and therefore a detailed description is omitted.

The identification sensor 104 may be mounted on the portable terminal 401. Then, the identification sensor 104 transmits data to the vehicle-mounted device 100 through the control center 200. Then, the user may be identified by comparing the data, which the vehicle-mounted device 100 receives, and the criteria data, which is stored in the memory 105.

The memory 105 serves as cancellation condition setting means and intrusion sensing condition setting means, and stores data, which is necessary for operating the anti-theft system. The memory 105 uses a nonvolatile memory, such as a flash memory, to maintain stored contents even when the vehicle is parked (an ignition switch is off). The criteria data, based on which the identification sensor 104 identifies the user, is also stored in the memory 105.

The vehicle-mounted device 100 includes a GPS (Global Positioning System) 107. The GPS 107 senses a present location of the vehicle, and serves as parking location sensing means of the present invention. Besides the GPS 107, a known magnetic field sensor, a gyroscope, a distance sensor, a rotation sensor of a steering wheel and a wheel sensor of each rolling wheel may be used. Measured values by these sensors may have errors, characteristics of which are mutually different. Thus, a plurality of sensors may be used to complement each other.

The vehicle-mounted device 100 includes an immobilizer 108, an intrusion sensor 109, an electronic key 110, a body ECU 111 and an engine ECU 112. The immobilizer 108 permits an engine to start based on an ID code check. The intrusion sensor 109 senses an existence of an intruder in the vehicle, based on the radio wave, the ultrasonic wave, vibration of the vehicle and breaks of a window, and serves as the status sensing means of the present invention.

A security ECU 114 serves as distance calculating means, interval calculating means, cancellation condition setting means, cancellation determining means, intrusion sensing condition setting means, intrusion determining means, security level setting means, security level canceling means and theft risk calculating means. The security ECU 114 is composed as a general computer, having a known CPU, ROM, RAM, I/O that is an input-output circuit, and bus lines connecting these components with each other. The security ECU 114 includes a processing circuit to exchange data and signals with an external device and a sensor. The CPU controls, based on a control program and data, which are stored in ROM and RAM. The security ECU 114 operates processes, such as a change of security levels, generation of warning signals, based on data and signals from the external devices and sensors. The security ECU 114 transmits commands of permissions and/or prohibitions of an engine stop and an engine start toward the engine ECU 112, which controls the engine.

The vehicle-mounted device 100 is designed to transmit data to the control center 200 every predetermined period of time (e.g. every 10 minutes), which is memorized in the memory 105. The transmitted data indicates that the vehicle is under a normal condition. Therefore, the control center 200 determines that some anomalies happen to a parked vehicle in a case where the vehicle-mounted device 100 stops transmitting the data to the control center 200. Also, the control center 200 may request the vehicle-mounted device 100 for vehicle status information every predetermined period of time (e.g., 10 minutes). Then, the vehicle-mounted device 100 may transmit data about a vehicle status to the control center 200.

The control center 200 includes a server 201, the second communication device 202, a monitoring control panel 203 and the like. The server 201 is composed by a known computer, workstation and the like. In the control center 200, a program, which runs on the server 201, monitors a parked vehicle through the monitoring control panel 203. The program monitors the parked vehicle based on various data transmitted from the vehicle-mounted device 100. Also, the control center 200 remotely controls the vehicle-mounted device 100.

The control center 200 includes three databases (or data storages) A-C. Data about a vehicle and a user of the vehicle anti-theft system and data about an operation status of the vehicle-mounted device 100 are stored in the database A. Data for determining a risk level of a theft, such data as information about parking space locations and past vehicle theft information, are stored in the database B. The past vehicle theft information includes times and locations of thefts, types of vehicles, details of anomalies, details of guilty deeds (mischief, vehicle burglar, and vehicle theft) and a classification of committed crimes or attempted crimes. Data for determining anomalies of the vehicle based on transmitted data from the vehicle-mounted device 100 and data for analyzing the anomalies are stored in the database C.

Figure 6:
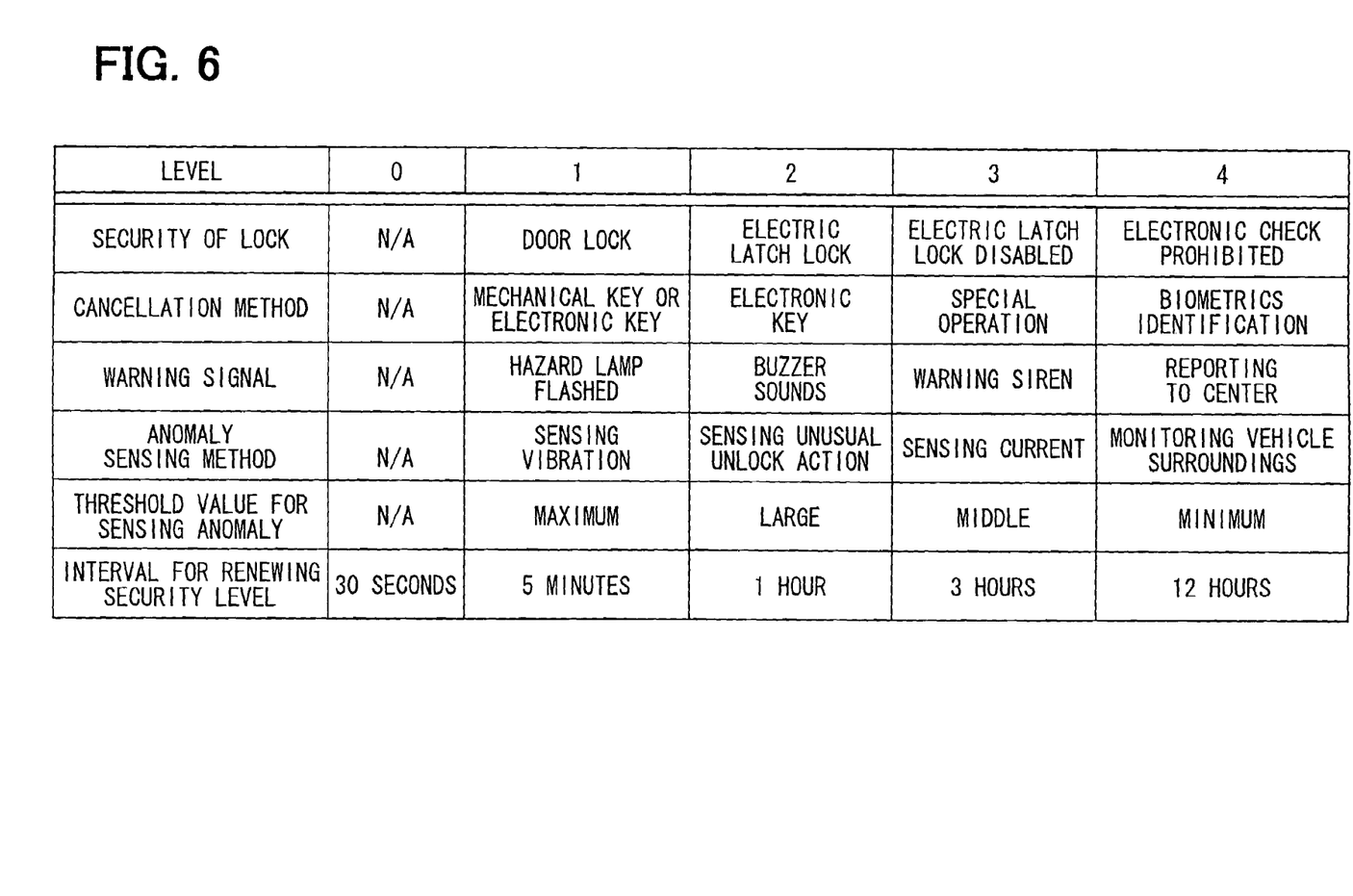
FIG. 6 is a table for showing a relationship between security levels, cancellation methods and anomaly sensing conditions.

FIG. 6 shows security of a lock that correspond to the security levels, methods to cancel the security level, methods to sense anomalies, threshold values for sensing the anomalies, warning signals in case of sensing a anomaly and intervals for renewing the security level. The security level includes five levels from level 0 to level 4. As a number of the level increases, the security level increases (the vehicle becomes more limited from being stolen). Each security level will be described.

At the security level 0, a door of the vehicle is not locked. There is no method for unlocking the door and no method for canceling the security level. Also, anomaly sensing is not activated so that the threshold value for vibration sensing is not set. Thus, the warning signals in case of sensing the anomaly are not operated. The level 0 is the most dangerous status so that the interval of renewing the security level is 30 seconds.

In the security level 1, the door is locked. The door is unlocked by a general mechanical key, which is inserted into a key cylinder to lock or unlock, or the electronic key 110, such as a wireless key. When the door is unlocked by the mechanical key or the electronic key, the security level is canceled (the security level becomes level 0). Also, the vibration sensor, which is included in the intrusion sensor 109, is activated to serve as a method for sensing the anomaly. When the unlock is not properly operated so that the vibration of the vehicle exceeds the predetermined threshold value, the anomaly is sensed. Then, the hazard lamp 125 is flashed to show the anomaly. The threshold value for sensing the vibration is set maximum (a sensitivity for sensing the vibration is set at the worst). The interval for renewing the security level is set at 5 minutes.

At the security level 2, the door is locked and the door is also kept locked by an electric latch (E-latch) 121 for locking the door. Only the electronic key 110, such as the known wireless key, can unlock the door (unlock the E-latch). The mechanical key cannot unlock the door. The security level is canceled (the security level becomes level 0), only when the door is unlocked by the electronic key 110. A vibration sensor and a door lock position switch, which is included in the intrusion sensor 109, are activated as a method for sensing the anomaly. When the door is not properly unlocked so that vibrations are generated, the anomaly is sensed. Also when the door is not properly unlocked so that a door lock position is set at an open status (an unusual unlock action happens), the anomaly is sensed. In case of the anomaly, flashing of the hazard lamp 125 and the buzzer sound of the warning device 124 show the anomalies. The threshold value for sensing the anomaly is generally large. However, the sensitivity for sensing the anomaly is better than that in the security level 1. The interval for renewing the security level is set at 1 hour.

In the security level 3, the door is locked and power supply for the electric latch (E-latch) 121 for locking the door is stopped by a latch power stopping circuit 122. The door is kept locked mechanically and electrically. Only a special operation, such as unlocking the door by use of command signals from the control center 200, can unlock the door. Neither the mechanical key nor the electronic key 110 can unlock the door. The security level is canceled (the security level becomes level 0), only when the door is unlocked by the special operation. The vibration sensing, the unusual unlock action sensing and a current sensing, which is included in the intrusion sensor 109, are activated as the method for sensing the anomaly. When the door is not properly unlocked so that the vibration is generated, the anomaly is sensed. When the door is not properly unlocked so that the door lock position is set at the open status (the unusual unlock action happens), the anomaly is sensed. Also when the door is not properly unlocked and the door is opened so that a current is generated for lighting the interior lamp and the like, the anomaly is sensed. In case of the anomaly, in addition to the flashing of the hazard lamp 125 and the buzzer sound of the warning device 124, howler of a siren 126, which sounds louder than the buzzer sound, show the anomaly. The threshold value for sensing anomaly is around middle range. However, the sensitivity for sensing the anomaly is better than that in the security level 2. The interval for renewing the security level is set at 3 hours.

In the security level 4, the door is locked. Only biometrics by use of the camera 102 or the identification sensor 104 can unlock the door. None of the mechanical key, the electronic key 110 or the special operation can unlock the door, because of an activation of an electronic checking prohibiting circuit 123. The security level is canceled (the security level becomes level 0), only when the user is identified by the biometrics. Also, the vibration sensing, the unusual unlock action sensing, the current sensing and vehicle monitoring are activated as the method for sensing the anomaly. The vehicle monitoring monitors a person, who is approaching the vehicle, by use of the surroundings-monitoring sensor 101, and regularly transmits information, which is captured by the camera 102, to the control center 200. In other words, in the level 4, a direct watching method is added to the methods for sensing the anomaly. In case of the anomaly sensed by these sensing methods, in addition to the flashing of the hazard lamp 125, the buzzer sound of the warning device 124 and the howler of the siren 126, a reporting device 127 reports the anomaly to the control center 200 through the first communication device 116. The threshold value for sensing the anomaly is the smallest among the five security levels. The security level is principally not changed. The interval for renewing the security level is set at 12 hours.

Conditions for determining the anomaly at each security level includes conditions for determining the anomaly at a lower security level than the each security level. For example, at the security level 3, in addition to a condition where the current exceeds the predetermined threshold value, the anomaly is sensed at anomaly conditions of levels 1 and 2. The anomaly condition of level 2 is a condition, where the vibration of the vehicle is sensed by the vibration sensor of the intrusion sensor 109, and the vibration exceeds the predetermined threshold value. The anomaly condition of level 1 is a condition, where the door is pried off or is unlocked by something except for the mechanical key or the electronic key 110.

In the above example, when security level is canceled, the security level becomes level 0. However, the security level may be decreased by one step.

Data, such as the security levels, conditions for cancellation, conditions for determining the anomaly and the like, is prestored in the memory 105. However, the latest corresponding data may be downloaded from the control center 200. Also, the user may be able to set the data by use of the vehicle-mounted device 100 through an input device (not shown). Furthermore, the data, which is set by use of the portable terminal 401 or PC 402, may be transmitted to the vehicle-mounted device 100 through the control center 200. In this case, alternatively the data may be directly transmitted to the vehicle-mounted device 100, without going through the control center 200.

A process for determining the security level based on the schedule information, which includes a usage schedule of the vehicle of the user, will be described with reference to FIG. 7. This process is operated repeatedly along with other processes by a control program, which is operated by a CPU (not shown) included in the security ECU 114.

When the vehicle is parked (S501: YES), a schedule of the user of the vehicle is checked (S502). A process of checking the schedule will be described.

Firstly, the vehicle requests the control center 200 for the schedule of the user of the vehicle. Then, the control center 200 requests the vehicle user, who is registered in the database A, the portable terminal 401, or the PC 402, for the user location information and the schedule information. When the user receives the request from the control center 200, the user checks an own schedule by use of the portable terminal 401, the PC 402, or the like. Then, the user sends the future date (or only time is accepted) for the vehicle to be used next and the schedule information, which includes destinations, to the control center 200. The control center 200 transmits the schedule information of the user to the vehicle.

Also, any schedule may be used if the schedule is stored in the portable terminal 401 or the PC 402, or if the schedule is recorded in a personal organizer. As for the schedule, a bulk schedule of the vehicle usage for a predetermined period of time, such as a week from the present time, may be transmitted.

Then, by use of the GPS 107, the present location information of the vehicle is sensed (S503).

The vehicle compares the present location information of the vehicle and the schedule information of the user to check whether the present parking location of the vehicle is a destination, which is included in the schedule information of the user. When the present parking location of the vehicle is the destination (S504: YES), a time (or an interval) T between the present time and the future time for the vehicle to be used next is calculated by use of the schedule information. The present time may be taken by the following methods. The present time may be directly timed by an RTC (Real Time Counter), which is included in the security ECU 144. Present time information, which is included in a GPS signal that is received by the GPS 107, may be used. The present time may be taken by communicating with other vehicle-mounted devices such as a car navigation system and the like. The present time may be taken from facilities and devices, which are outside of the vehicle, through communication network. Then, the security level is determined based on the calculated time (interval) T.

When $T \leq 1$ minute (t1) (S506: YES), the security level SL becomes level 0 (S507), and the door lock 120 is opened (S508).

When 1 minute (t1)$<T \leq 30$ minutes (t2) (S509: YES), the security level SL becomes level 1 (S510), and the door lock 120 is set (S511).

When 30 minutes (t2)$<T \leq 1$ hour (t3) (S512: YES), the security level SL becomes level 2 (S513), and the door lock 120 is set. Also, the latch 121 for locking the door is set (the door is double locked) (S514).

When 1 hour (t3)$<T \leq 24$ hours (t4) (S515: YES), the security level SL becomes level 3 (S516), and power supply for the latch (E-latch) 121 for locking the door is stopped by a latch power stopping circuit 122. The door is locked mechanically and electrically.

When 24 hour (t4)$<T$ (S515: NO), the security level SL becomes level 4 (S518), and an electronic check prohibiting circuit 123 is activated so that a general unlocking operation becomes not being able to unlock the door.

The security level is set at high level even if the user parks the vehicle at home parking space and the user is at home, in a case where the vehicle is not used for a while. In this case, it is very inconvenient for the user to wash the vehicle and to clean inside the vehicle. In other words, the security level is not properly determined if the calculation of the security level is only based on the schedule information of the user. Therefore, the security level can be set properly, if the security level is calculated based on both the schedule information of the user and the location information of the user.

Figure 2:
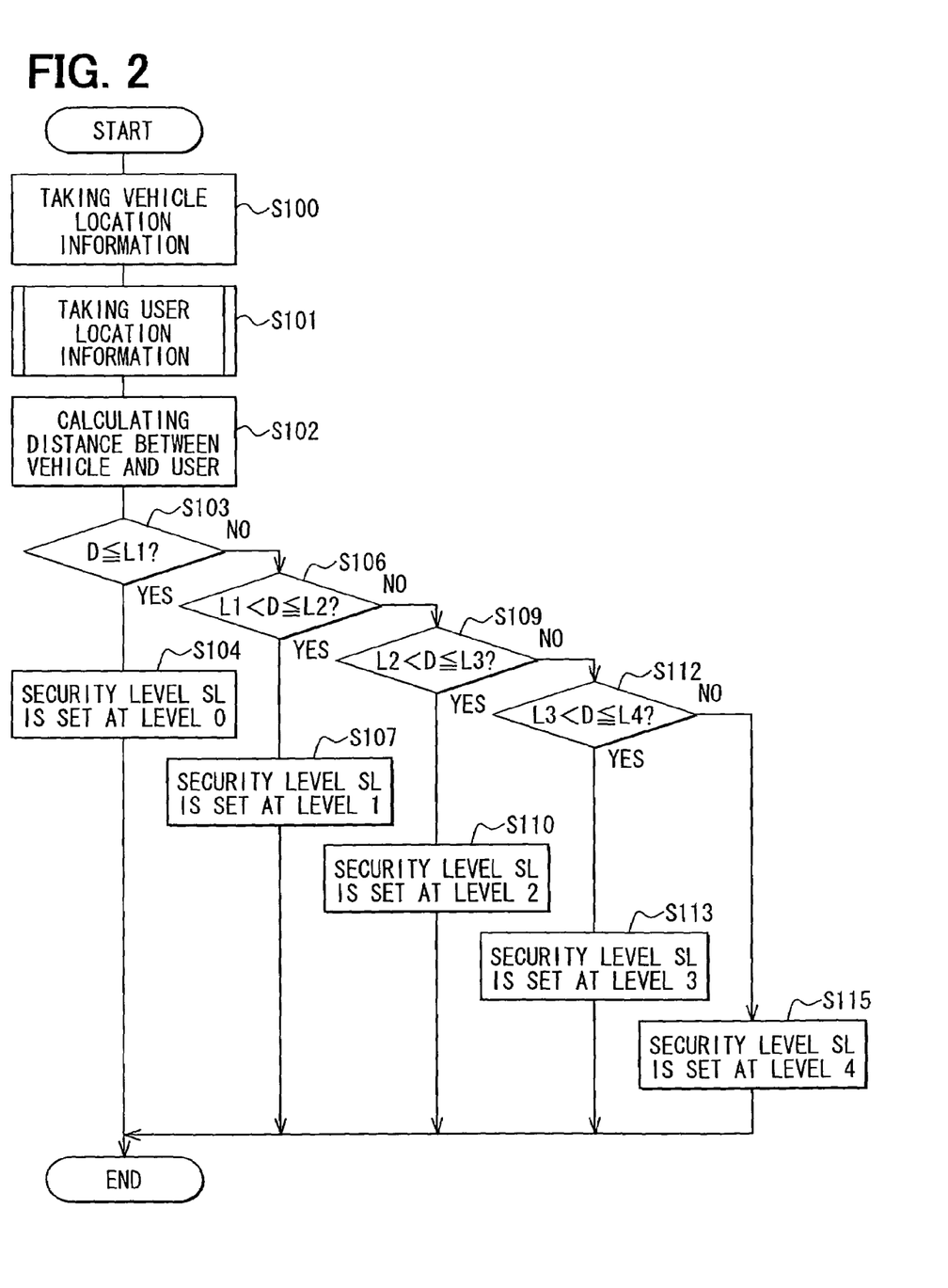
FIG. 2 is a flow diagram for explaining a process for determining a security level based on a distance between a user and a vehicle.

A process for determining the security level based on the distance between the vehicle and the user will be described with reference to FIG. 2. This process is operated repeatedly along with other processes by a control program, which is operated by a CPU (not shown) included in the security ECU 114.

When the vehicle is parked, the location of the vehicle is sensed by the GPS 107 (S100). Then, the present location of the user of the vehicle is taken (S101) and a detail process of a step S101 will be described later. Then, the distance D between the vehicle and the user is calculated (S102).

The security level is determined based on the calculated distance D as follows.

When $D \leq 5$ m (L1) (S103: YES), the security level SL becomes level 0 (S104).

When 5 m (L1)$<D \leq 1$ km (L2) (S106: YES), the security level SL becomes level 1 (S107).

When 1 km (L2)$<D \leq 50$ km (L3) (S109: YES), the security level SL becomes level 2 (S110).

When 50 km (L3)$<D \leq 100$ km (L4) (S112: YES), the security level SL becomes level 3 (S113).

When 100 km (L4)$<D$ (S112: NO), the security level SL becomes level 4 (S1115).

Figure 3:
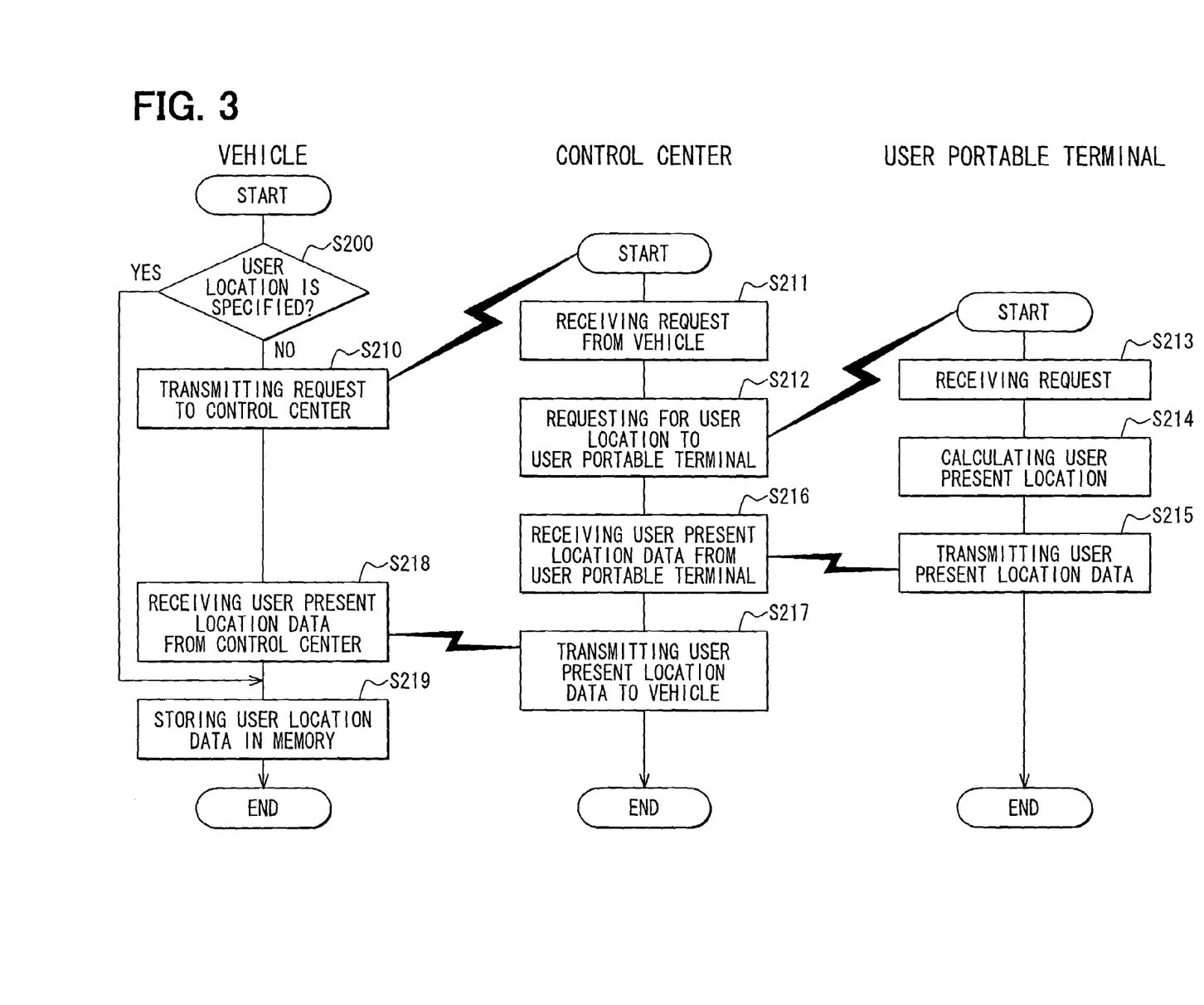
FIG. 3 is a flow diagram for explaining in detail a process for taking user location information.

A process for taking the present location of the user will be described with reference to FIG. 3. This process corresponds to the step S101 of the flow diagram shown in FIG. 2. This process is operated repeatedly along with other processes by a control program, which is operated by a CPU (not shown) included in the security ECU 114, when the process is operated in the vehicle-mounted device 100. The process is operated repeatedly along with other processes by a control program, which is stored in the server 201, when the process is operated in the control center 200.

The present location of the user may be specified without requesting the control center 200, if the camera 102, the identification sensor 104 or the like can sense the user, who, for example, exists around the vehicle. In this case (S200: YES), the present location of the user is stored in the memory 105 (S219). On the contrary, when the present location of the user is not specified (S200: NO), a request is transmitted to the control center 200 (S210).

When the control center 200 receives the request from the vehicle (S211), the control center 200 requests the user (the portable terminal 401 or the PC 402) for the present location data (S212). The vehicle of the user is registered in the database A. When the user receives the request from the control center 200 (S213), the user calculates an own present location by use of the portable terminal 401, the PC 402 or the like (S214). Then, the user transmits the calculated present location data to the control center 200 (S215).

As a method for calculating the present location, devices other than the portable terminal 401 or the PC 402 may be used. In a case where the present location is checked by the portable terminal 401 or the PC 402, the present location data, which is indicated by the portable terminal 401 or the PC 402, may be automatically converted into a readable data format for the control center 200 and be automatically transmitted to the control center 200. Conversely, the conversion of the present location data format may be performed at the control center 200.

When the control center 200 receives the present location data (S216), the control center 200 transmits the present location data to the vehicle (the vehicle-mounted device 100) (S217). When the vehicle receives the present location data from the control center 200 (S218), the vehicle stored the present location data in the memory 105 (S219).

The present location information of the user may be received by a communication between the vehicle and the portable terminal 401 or the PC 402. In other words, the vehicle transmits the request for the present location to the portable terminal 401 or the PC 402. Then, the portable terminal 401 or the PC 402 returns the present location data to the vehicle.

Figure 4:
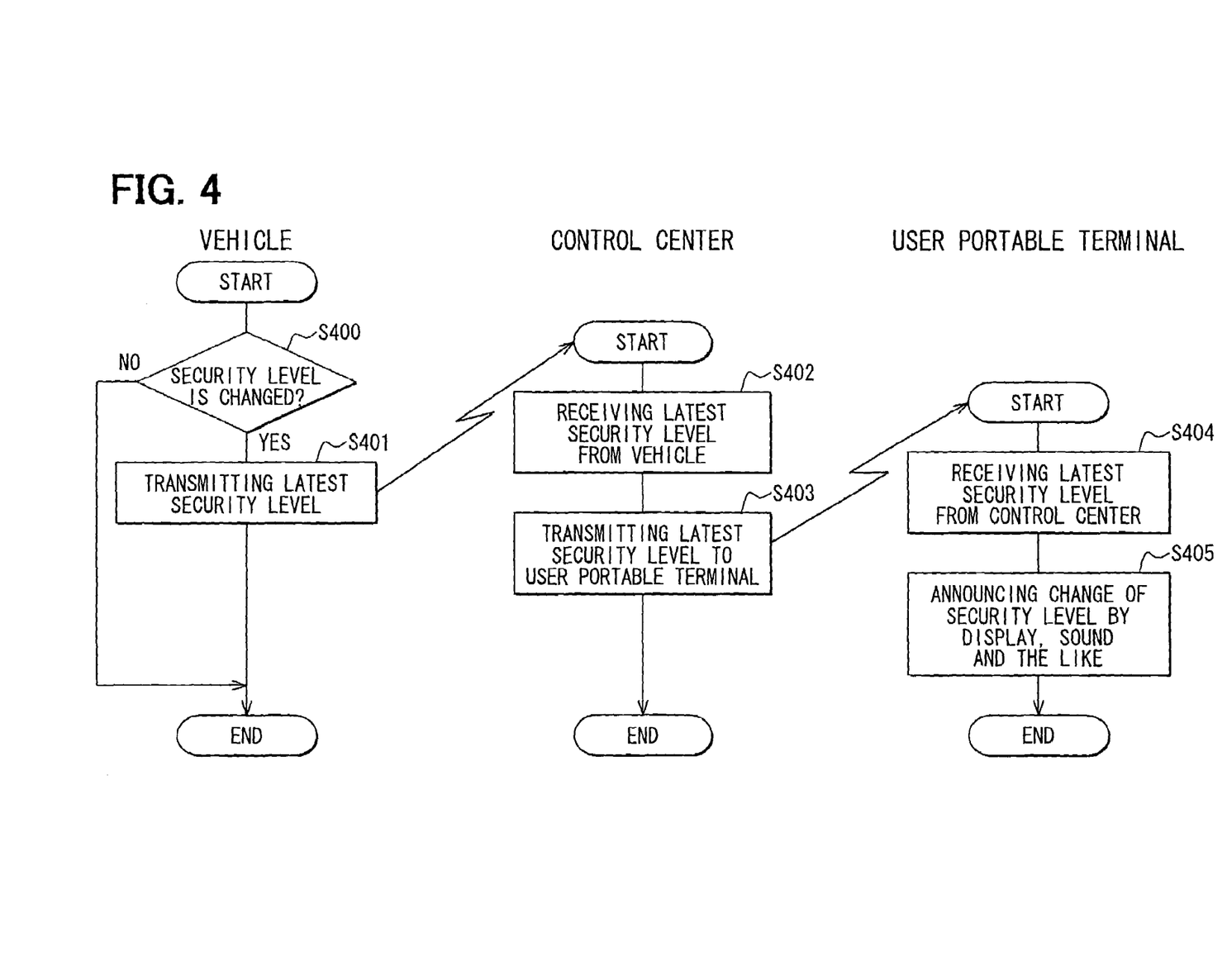
FIG. 4 is a flow diagram for explaining a process of reporting the user about a change of a security level.

A process for reporting the user about a change of the security level according to a change of the distance between the vehicle and the user will be described with reference to FIG. 4. The security level change reporting process is operated repeatedly along with other processes by a control program, which is operated by a CPU (not shown) included in the security ECU 114, when the process is operated by the vehicle-mounted device 100. The process is operated repeatedly along with other processes by a control program, which is stored in the server 201, when the process is operated in the control center 200.

Figure 7:
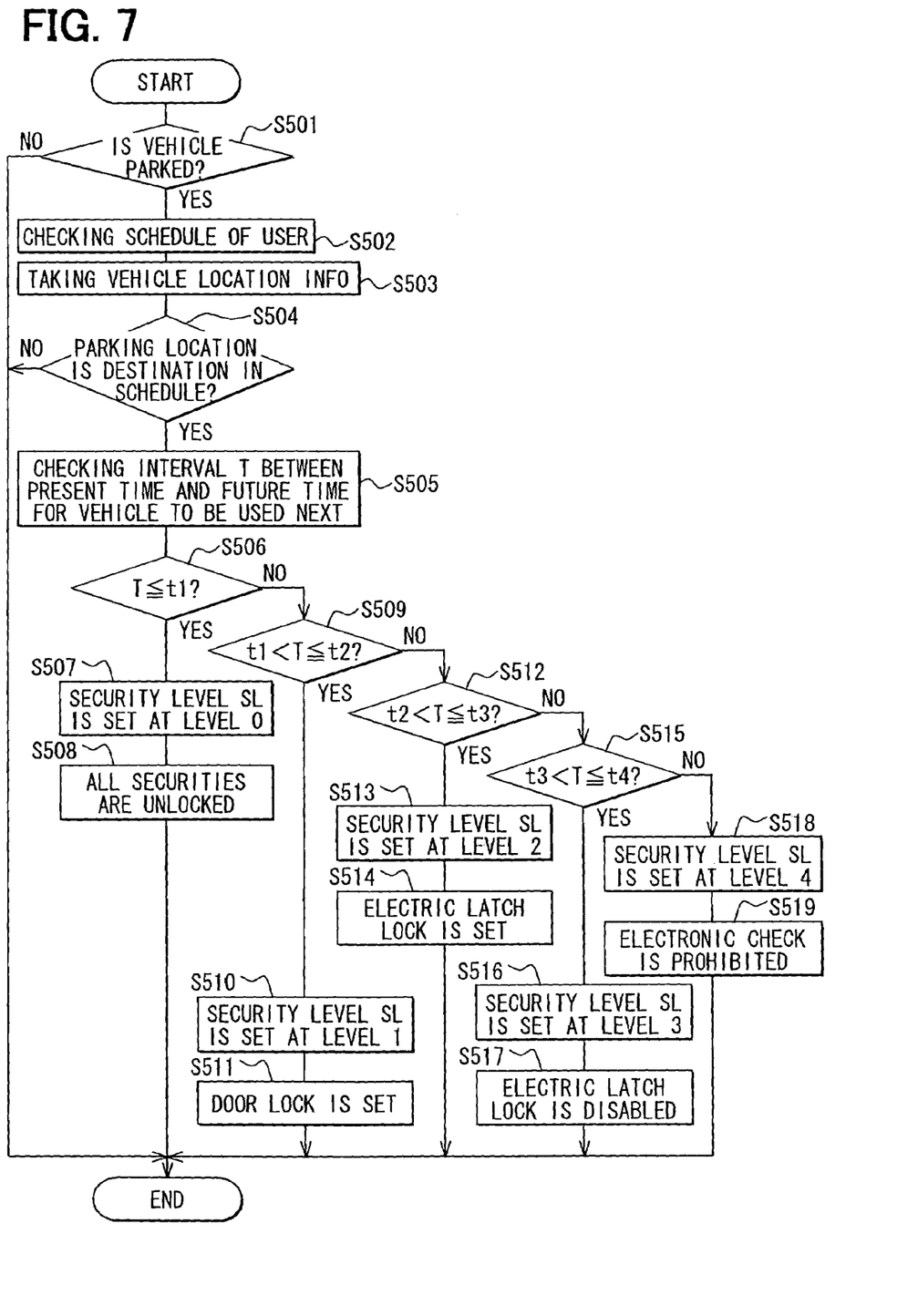
FIG. 7 is a flow diagram for explaining a process for determining a security level based on user schedule information.

In the security level determining process shown in FIG. 7, when the security level is changed according to the change of the distance between the vehicle and the user (S400: YES), the vehicle transmits a latest (changed) security level to the control center 200 (S401). When the control center 200 receives the latest security level (S402), the control center 200 confirms the change of the security level of the vehicle by referring the database A. Then, the database is renewed and the latest security level is transmitted to the portable terminal 401 or the PC 402 of the user of the vehicle.

When the portable terminal 401 or the PC 402 receives the latest security level from the control center 200 (S404), the portable terminal 401 or the PC 402 announces the change of the security level by use of a display, a speaker and the like, all of which are not shown.

Figure 5:
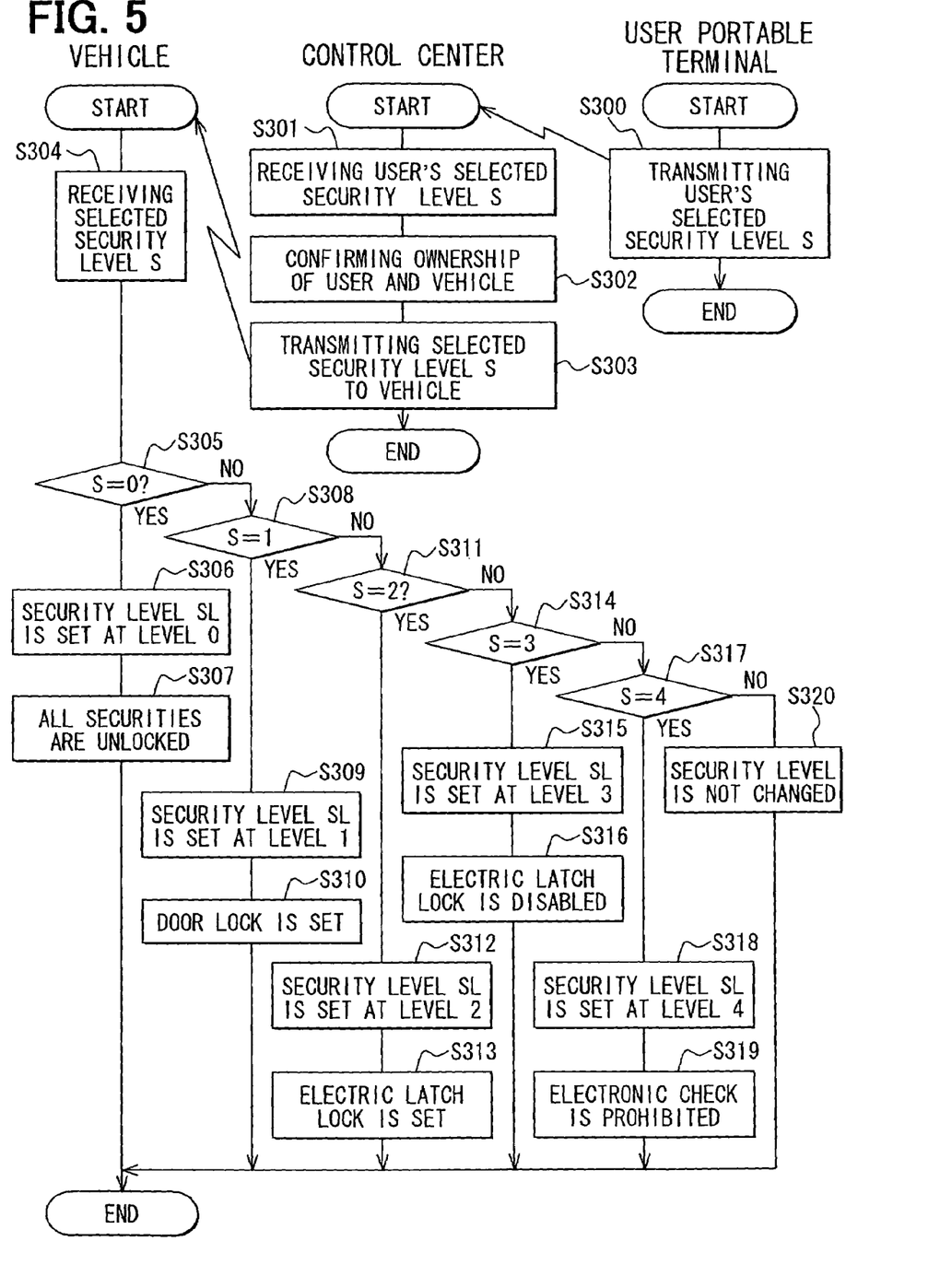
FIG. 5 is a flow diagram for explaining a process for the user to change the security level.

A process for arbitrarily selecting the security level by use of the portable terminal of the user will be described with reference to FIG. 5. This process for remotely selecting the security level is operated repeatedly along with other processes by a control program, which is operated by a CPU (not shown) included in the security ECU 114, when the process is operated in the vehicle. The process is operated repeatedly along with other processes by a control program, which is stored in the server 201, when the process is operated in the control center 200.

The user of the vehicle selects a new security level S by use of the portable terminal 401 and the PC 402, and transmits the new security level S to the control center 200 (S300). When the control center 200 receives the new security level, which is selected by the user of the vehicle, the control center 200 confirms an ownership of the user and the vehicle by referring the database A. Then, the control center 200 transmits the selected new security level S to the vehicle-mounted device 100 or the vehicle, which is registered by the user (S303).

At S306, S309, S312, S315 and S318, the vehicle sets the security level SL of the vehicle based on the new security level S, which is received from the control center 200 (S304). Then, the vehicle is locked by a method according to the security level SL (S307, S310, S313, S316, S319).

Control methods (S307, S310, S313, S316, S319) of the door lock 120 according to the security level SL coincide with the methods (S508, S511, S514, S517, S519), which are previously described with reference to FIG. 7. Thus, a detailed explanation of the control methods is omitted.

When the new security level S coincides with the security levels SL of the vehicle, the security level SL is not changed and the process is finished.

Above-described example shows that the security level is assigned through the control center 200. However, the security level may be directly assigned when the user communicates with vehicle through the portable terminal 401 or the PC 402, instead of using the control center 200.

When there are a security level based on the schedule information and a security level based on the location information, a security level, which indicates a higher level, is selected among the two security levels, in order to give the security priority.

Also, the user's convenience may be given priority to set the security level. For example, the security level may be changed to level 0, even when the schedule indicates that there is another 15 minutes before the vehicle is used next, if the user is around the vehicle. Likewise, the security level may be changed to level 1, even when the schedule indicates that there is another 1 hour before the vehicle is used next, if the user is in a region, where the user can reach the vehicle within 30 minutes.

Figure 8:
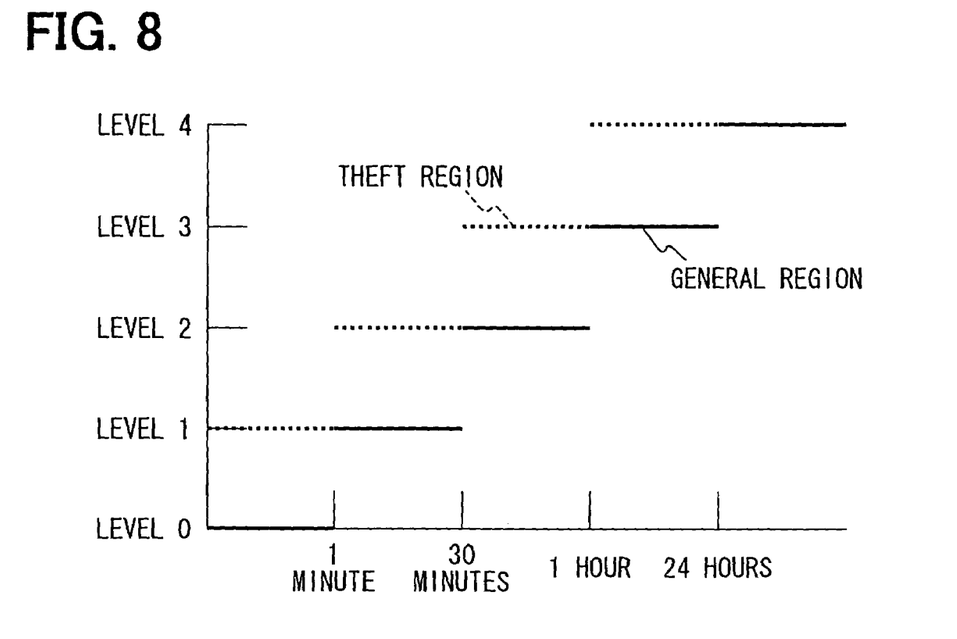
FIG. 8 is a view showing security levels based on risk levels of a theft and the user schedule information.

FIG. 8 shows a method for determining the security level based on a combination of the risk level of the theft and the user's schedule information. The security level at a general region, where thefts do not occur often, is described by solid lines. The security level at a theft region, where thefts occur very often, is described by dashed lines. The security level at the theft region is tighten (set higher) by one step compared with the security level at the general region. In other words, in the theft region, the security level is not set at level 0. Also in a case where the user is away from the vehicle for more than one hour, the security level becomes level 4 (the security level would become level 3 if at the general region). Likewise, in a safe region, where the thefts occur much less often than the general region, the security level may be reduced (set lower) by one step compared with the security level at the general region. The following is a relationship between the security level at the general region and a time (or an interval) (T) between a time of parking the vehicle and a time of using the vehicle next.

Figure 9:
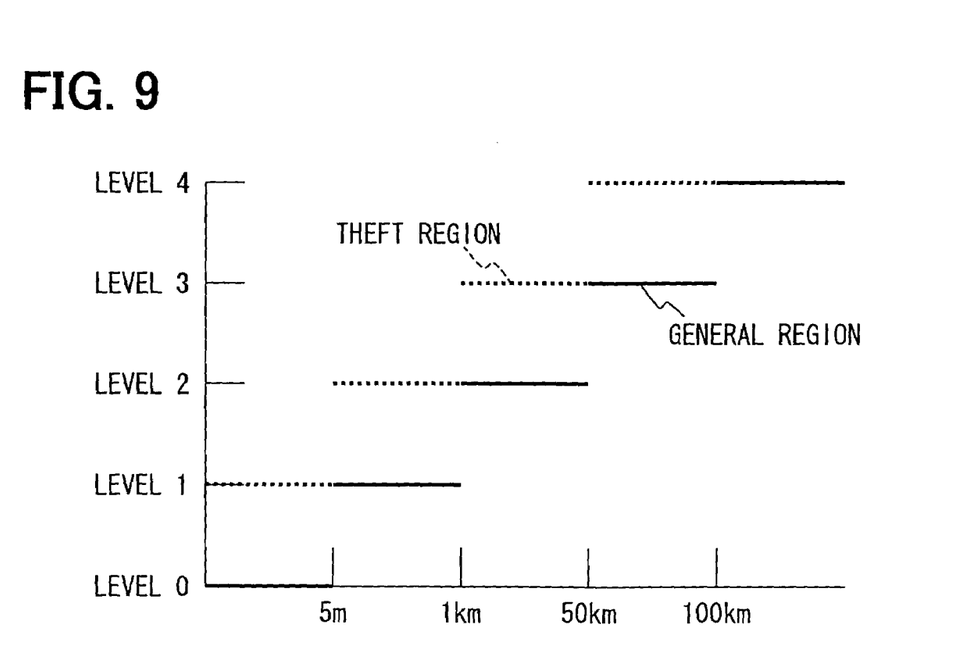
FIG. 9 is a view showing security levels based on the risk levels of the theft and the user location information.

(1) Level 0: $T \leq 1$ minute (t1)
(2) Level 1: 1 minute (t1)$<T \leq 30$ minutes (t2)
(3) Level 2: 30 minutes (t2)$<T \leq 1$ hour (t3)
(4) Level 3: 1 hour (t3)$<T \leq 24$ hours (t4)
(5) Level 4: 24 hours (t4)$<T$ FIG. 9 shows a method for determining the security level based on a combination of the risk level of the theft and the user's schedule information. The security level at the general region, where thefts do not occur often, is described by solid lines. The security level at the theft region, where thefts occur very often, is described by dashed lines. The security level at the theft region is tighten (set higher) by one step compared with the security level at the general region. In other words, at the theft region, the security level is not set at level 0. Also in a case where the user is away from the vehicle by equal to or more than 50 km, the security level becomes level 4 (the security level would become level 3, if at the general region). Likewise, in a safe region, where the thefts occur much less often than the general region, the security level may be reduced (set lower) by one step compared with the security level at the general region. The following is a relationship between the security level at the general region and a distance (D) between the vehicle and the user.

(1) Level 0: $D \leq 5$ m (L1)
(2) Level 1: 5 m (L1)$<D \leq 1$ km (L2)
(3) Level 2: 1 km (L2)$<D \leq 50$ km (L3)

(4) Level 3: 50 km (L3)<D≦100 km (L4)

(5) Level 4: 100 km (L4)<D

Figure 10:
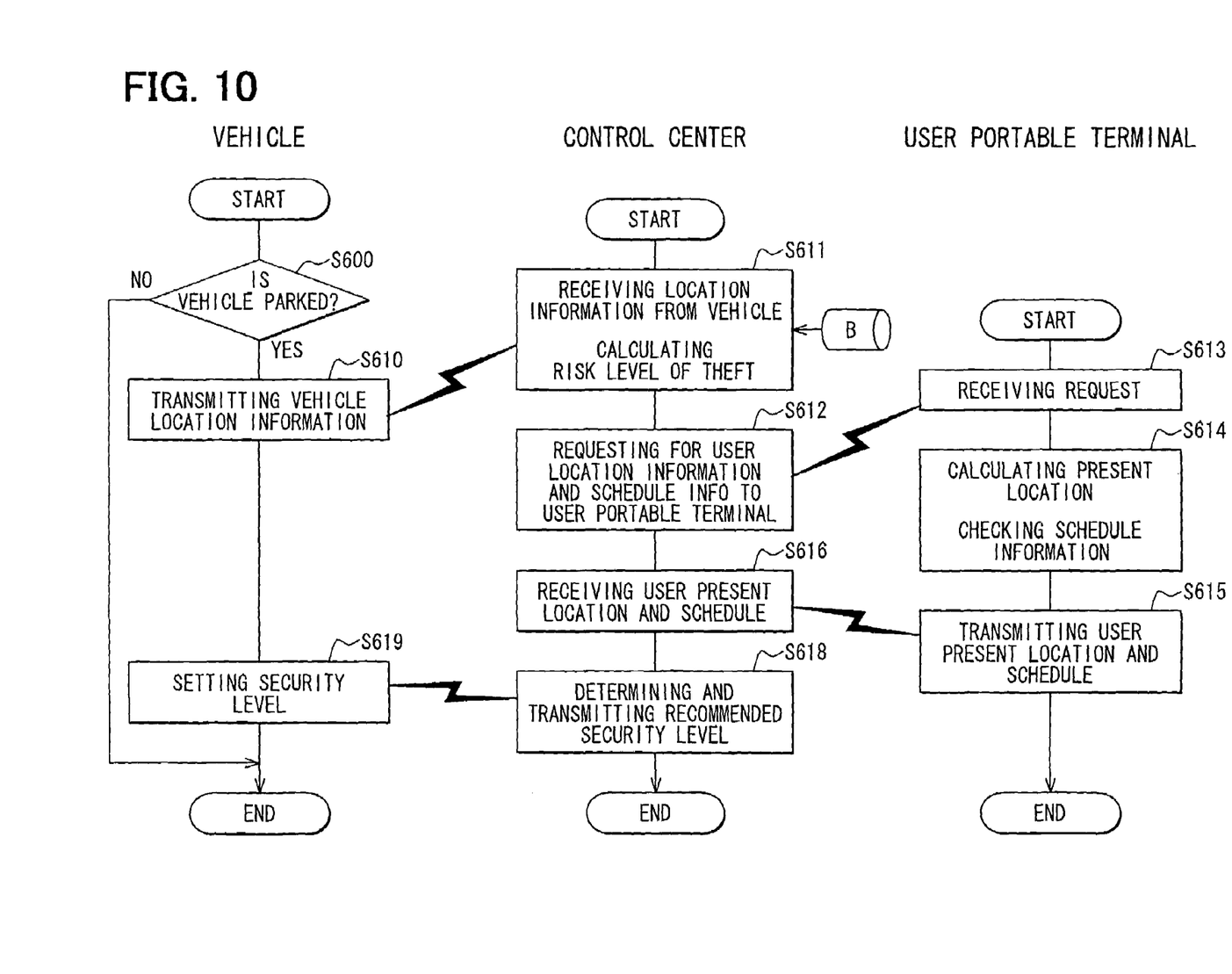
FIG. 10 is a flow diagram for determining security levels.

A process for determining the security level based on the risk level of the theft, the user's schedule and the distance between the vehicle and the user will be described with reference to FIG. 10. This process is operated repeatedly along with other processes by a control program, which is operated by a CPU (not shown) included in the security ECU 114.

In a case where the vehicle of the user is parked (S600: YES), the present location information, which is sensed by the GPS 107, of the vehicle is transmitted to the control center 200 (S610). In the control center 200, the database B is referred based on the received present location information of the vehicle. Then, the risk level of the theft at a parking region, which includes a present location of the vehicle, is calculated (S611). Specifically, the risk level of the theft is calculated based on 1) a type of parking space, 2) an existence of a parking door, 3) an existence of a parking manager, 4) a distance from the past theft location and 5) a time when the vehicle is parked. The type of parking space includes a home parking space, a contract parking space, a temporal rental parking space and an unauthorized parking.

Then, the control center 200 requests the user (the portable terminal 401 or PC 402) of the vehicle for the location information of the user and the schedule information (S612). Here the vehicle of the user is registered in the database A. When the user receives the request from the control center 200 (S613), the user checks an own present location by use of the portable terminal 401 or the PC 402, and checks an own schedule (S614). Then, the user transmits the own present location and the time (the own schedule) for the user to use the vehicle next to the control center 200 (S615). Here the time may include only a time without date.

As a method for checking the present location, devices other than the portable terminal 401 or the PC 402 may be used. Also, any schedule may be used if the schedule is stored in the portable terminal 401 or the PC 402, or if the schedule is recorded in the personal organizer. As for the schedule, the bulk schedule of the vehicle usage for the predetermined period of time, such as a week from that time, may be transmitted.

In a case where the present location is checked by the portable terminal 401 or the PC 402, the present location data, which is indicated by the portable terminal 401 or the PC 402, may be automatically converted into a readable data format for the control center 200 and be automatically transmitted to the control center 200. Conversely, the conversion of the present location data format may be performed at the control center 200.

The present location information of the user may be received by the vehicle through communication between the vehicle and the portable terminal 401 or the PC 402. In other words, the vehicle transmits the request for the present location to the portable terminal 401 or the PC 402. Then, the portable terminal 401 or the PC 402 returns the present location data to the vehicle.

The control center 200 calculates the distance between the user and the vehicle based on the present location data of the user, which the control center 200 receives at step S616, and the present location of the vehicle. Then, the security level is determined based on the distance to the user with reference to FIG. 9. Also, the interval between the present time and the time (the future time) for the vehicle to be used next is calculated based on the schedule of the user and the present time, which are received. Then, the security level is determined based on the schedule of the user with reference to FIG. 8. Then, a safer security level between the two security levels is defined as a recommended security level. Then the recommended security level is transmitted to the vehicle-mounted device 100 (S618).

For example, in a case where a 45-minute meeting is held at a place, which is 100 m away from the vehicle in the general region, the security level based on the distance shown in FIG. 9 indicates level 1 and the security level based on the schedule shown in FIG. 8 indicates level 2. In this case, because the safer security level needs to be selected, the recommended security level becomes level 2.

A modification of the process for determining the security level will be described. Even in the same region, the risk level of the theft is changed with a parking location and surrounding environments, such as a place around a police station, a home parking space and a corporate parking space. Therefore, a process for determining a safer security level will be described. In the process, a date table is equipped in a database to calculate detailed risks in order to determine the risk level of the theft in detail. Steps S700, S710-S716, S718 and S719 in FIG. 11 correspond to steps S600, S610-S616, S618 and S619 in FIG. 10 respectively. A process shown in FIG. 11 has an additional step S717, compared with a process shown in FIG. 10. Thus, a detailed explanation of the steps (S700, S710-S716, S718 and S719) will be omitted.

Figure 11:
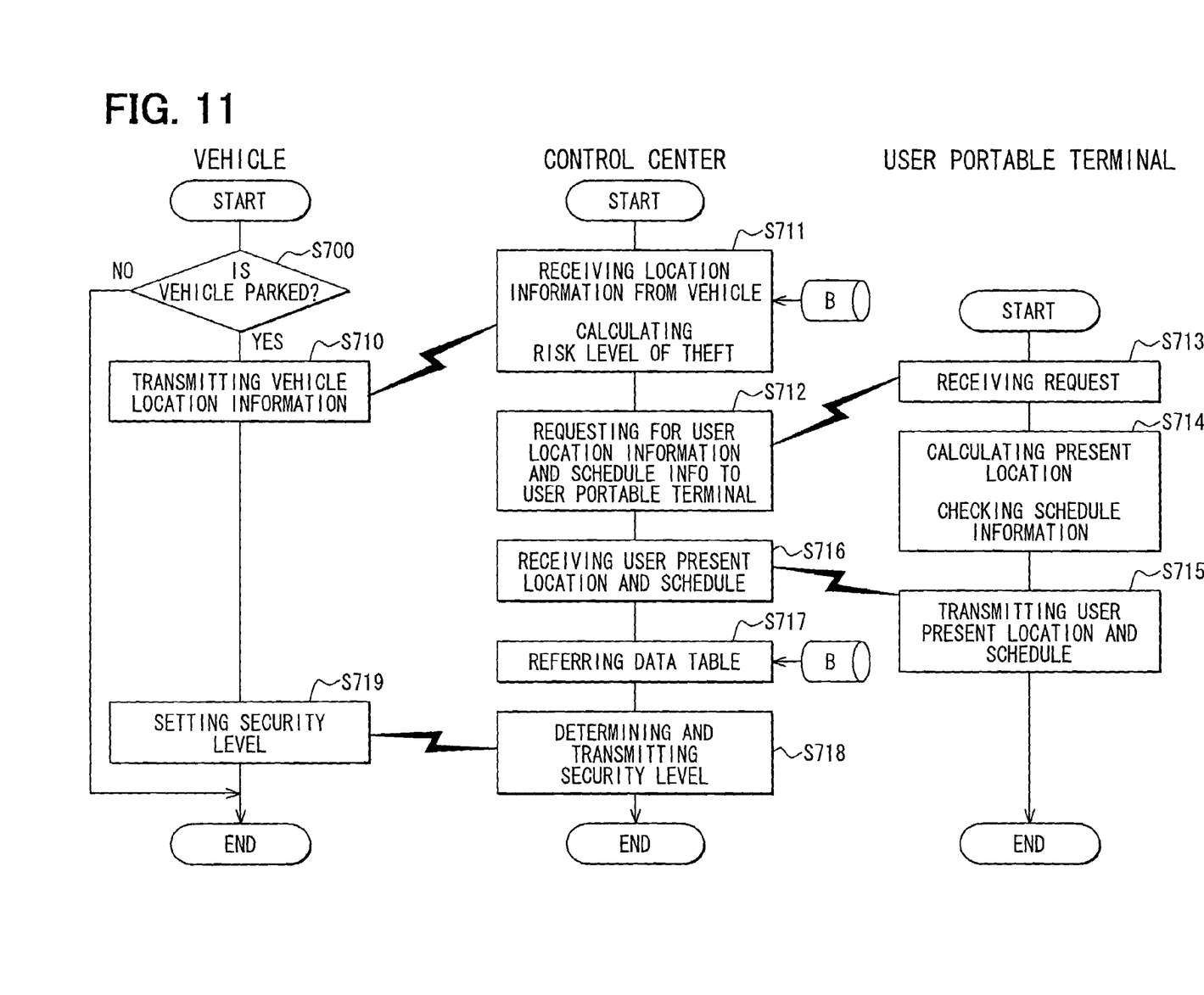
FIG. 11 is a modified flow diagram for determining security levels.

A process of the step S717 in FIG. 11 will be described. At first, the risk level of the theft, which is determined based on a number of a past vehicle theft in a region (a city, an area, a town, a village, a village section and a neighborhood) at step S711, is defined as a basic risk level of the theft. Then, a risk correction degree is determined based on a probability of theft happening to the vehicle according to a physical relationship with a facility in the region. For example, a risk correction degree of a region, which is located within a predetermined distance from a police station, becomes −2, because the region is supposed to be safer in general. Also a risk correction degree of a region, such as a monthly rental parking space and a region where houses are sparse located, becomes +2, because a suspicious person is not checked adequately in the region. Then, the risk level of the theft is determined by adding the risk correction degree to the basic risk level of the theft.

The basic risk levels of the theft by a region unit and the risk correction degree of each facility may be stored as the data table in the database B of the server 201. The basic risk level of the thefts and the risk correction degree may be automatically or manually renewed based on a latest number of the vehicle theft. In determining the security level, the risk correction degrees are determined based on the parking location and the surrounding environments with reference to the data table in the database B. Then, a final security level is determined based on the risk level of the theft, which is calculated by adding the risk correction degree to the pre-calculated basic risk level of the theft.

In the above-described two processes for determining the security level based on the risk level of the theft, the security level may be determined based on the risk level of the theft and only one of the distance and the schedule.

Additional advantages and modifications will readily occur to those skilled in the art. The invention in its broader terms is therefore not limited to the specific details, representative apparatus, and illustrative examples shown and described.

What is claimed is:

1. An anti-theft system for a vehicle comprising:
   schedule taking means for taking a usage schedule of the vehicle, wherein the usage schedule of the vehicle includes a future time for the vehicle to be used next;

interval calculating means for calculating an interval between a present time and the future time;

security level setting means for setting a security level of the anti-theft system based on the interval between the present time and the future time;

a data storage that includes vehicle theft information, wherein the vehicle theft information includes at least a location, where a vehicle theft happened in a past; and theft risk calculating means for calculating a risk level of a theft based on a parking condition of the vehicle and the vehicle theft information, which is stored in the data storage, wherein:

the risk level of the theft indicates a probability of the theft happening to the vehicle; and the parking condition includes at least a present parking location of the vehicle, wherein the security level setting means sets the security level of the anti-theft system also based on the risk level of the theft.

2. The anti-theft system according to claim 1, further comprising:

cancellation condition setting means for setting a cancellation condition for canceling the set security level of the anti-theft system according to the set security level;

status sensing means for sensing a status of the vehicle;

cancellation determining means for determining that the cancellation condition is satisfied when the sensed status of the vehicle coincides with the cancellation condition; and security level canceling means for canceling the set security level of the anti-theft system, when it is determined that the cancellation condition is satisfied.

3. The anti-theft system according to claim 1, further comprising:

status sensing means for sensing a status of the vehicle;

intrusion sensing condition setting means for setting an intrusion sensing condition for sensing an intrusion into the vehicle according to the set security level; and intrusion determining means for determining that the vehicle is intruded when the sensed status of the vehicle coincides with the intrusion sensing condition.

4. The anti-theft system according to claim 3, further comprising alarming means for alarming a user of the vehicle about the intrusion into the vehicle when it is determined that the vehicle is intruded.

5. The anti-theft system according to claim 2, further comprising user identifying means for identifying a user of the vehicle, wherein the cancellation condition further includes that a person who tries to cancel the security level is the user of the vehicle.

6. The anti-theft system according to claim 3, further comprising user identifying means for identifying a user of the vehicle, wherein the intrusion sensing condition further includes that an intruder into the vehicle is not the user of the vehicle.

7. The anti-theft system according to claim 1, further comprising:

a vehicle-mounted device, which is installed in the vehicle; and a control center, which includes the data storage.

8. The anti-theft system according to claim 1, wherein:

each of the plurality of security levels corresponds to a different state of a security of a lock of the vehicle.

9. The anti-theft system according to claim 1, wherein:

each of the plurality of security levels corresponds to a different method for canceling a lock of the vehicle.

10. The anti-theft system according to claim 1, wherein:

each of the plurality of security levels corresponds to a different method for warning.

11. The anti-theft system according to claim 1, wherein:

each of the plurality of security levels corresponds to a different method for detecting theft.

12. The anti-theft system according to claim 1, wherein:

as the interval between the present time and the future time increases, the security level setting means sets the security level by selecting a higher security level from the plurality of security levels.

13. The anti-theft system according to claim 1, further comprising:

a plurality of security units, each of which corresponds to a corresponding one of the plurality of security levels.

* * * * *